United States Patent [19]

Barthelmess

[11] 4,295,803
[45] Oct. 20, 1981

[54] SEPARATING MACHINE

[75] Inventor: Ulrich Barthelmess, Niederstotzingen, Fed. Rep. of Germany

[73] Assignee: Omya GmbH, Cologne, Fed. Rep. of Germany

[21] Appl. No.: 44,623

[22] Filed: Jun. 1, 1979

[30] Foreign Application Priority Data

Jun. 9, 1978 [DE] Fed. Rep. of Germany ....... 2825400

[51] Int. Cl.³ .................... F04B 17/00; F04B 35/04
[52] U.S. Cl. ............................ 417/423 R; 415/10; 416/3
[58] Field of Search .............. 417/423, 424; 415/10; 416/3; 308/10; 366/24

[56] References Cited

U.S. PATENT DOCUMENTS

| 2,269,412 | 1/1942 | Sturtevant . | |
|---|---|---|---|
| 2,492,792 | 12/1949 | Ford | 366/25 |
| 3,615,008 | 10/1971 | Alpha . | |
| 4,057,369 | 11/1977 | Isenberg | 308/10 |
| 4,154,489 | 5/1979 | Lyman | 308/10 |
| 4,167,296 | 9/1979 | Dendy | 308/10 |

FOREIGN PATENT DOCUMENTS

| 6610737 | 8/1965 | Fed. Rep. of Germany . |
|---|---|---|
| 2333945 | 1/1977 | France . |
| 1123867 | 8/1968 | United Kingdom . |
| 1134228 | 11/1968 | United Kingdom . |
| 1152274 | 5/1969 | United Kingdom . |
| 1155072 | 6/1969 | United Kingdom . |
| 1197850 | 7/1970 | United Kingdom . |
| 1268475 | 3/1972 | United Kingdom . |
| 1413835 | 11/1975 | United Kingdom . |
| 1482700 | 8/1977 | United Kingdom . |

Primary Examiner—Robert W. Jenkins
Attorney, Agent, or Firm—Neuman, Williams, Anderson & Olson

[57] ABSTRACT

Separating apparatus comprises a rotor having a plurality of impeller blades rotatably mounted in a support housing. In the normal course of apparatus use, fluid flow occurs through opposed rotor open ends. Drive motor elements for rotating the rotor are mounted partly in the rotor and partly in the surrounding casing whereby the rotor may be driven without the necessity of a drive shaft attached to the rotor, and the opposed rotor ends remain unobstructed.

In one rotor embodiment, fluid enters the opposed rotor ends and is discharged radially by the rotor blades. In a second embodiment the fluid enters one rotor end and is discharged along an axial path from the opposite end.

10 Claims, 5 Drawing Figures

SEPARATING MACHINE

This invention relates to a flow machine having a rotor comprising blade members and supporting rings, rotatably mounted in a housing. In different machine embodiments, a flowable medium may be discharged from a rotor radially or axially of the rotor blade impellers arranged in annular arrays. Flow devices of this type are employed as separating wheels adapted to transport, or compress liquid or gaseous media and adapted to carry out separating operations in or by means of these media.

Also certain separating machines of the prior art are based on the principle that the flow of the medium being processed through a counter-rotating machine is reversed, and the rotor, now turning counter to the flow direction, acts as a resistance thereby forming a rotating filter or separator which allows a corresponding medium (gas or liquid) to pass but not foreign bodies contained therein such as dirt, drops, etc.

Hitherto all the rotors of the prior art separating machines have been provided with a central shaft that is supported in an opening in a housing and driven by a motor arranged exteriorly of the housing. Most commonly, the shaft engages the rotor at one rotor end, the central intake opening of the rotor being provided on the end of the rotor disposed opposite the shaft. There are, however, also machines with the shaft engaging both rotor ends. Regardless of the shaft disposition, the central shaft presents substantial difficulties with respect to its support bearing and passage through the housing. Thus, expensive bearings and seals are normally required to assure proper shaft operation. Also, a shaft lying in the rotor flow channel obviously obstructs the flow therethrough. The shaft and its connection with the rotor as well as the rotor itself must be of sturdy construction in order to transmit the drive energy to the impeller blades.

It is thus an object of the invention to avoid the disadvantages of the above-noted prior art devices due to the presence of a central shaft, by creating a separating machine that does not require such central actuating shaft. The solution of this problem lies, in accordance with this invention, in providing a rotor (in "radially discharging" embodiments) consisting of two face rings supported with their outer peripheries by a supporting housing, between which rings there extend impeller blades. The rotor constructions employed in "axially discharging" embodiments comprise a single driven ring supported about its outer circumference by a housing and having impeller blades mounted on the inner periphery.

In accordance with this invention, therefore, each face ring of the two ring or single ring rotors employed is supported on its outer circumference in a housing. The drive imparting rotational movement to the rotor is incorporated in the ring or rings and the surrounding housing so as to eliminate the previously necessary central shaft. The medium processed by the apparatus may thus flow through a relatively large, unimpeded flow cross-section of the open rotor ring or rings of the rotors employed in the specific apparatus embodiment.

The rotor bearings are preferably formed as electromagnetic, hydrostatic or aerostatic bearings, especially in high speed machines. The electromagnetic bearing renders possible with the assistance of an electronic control system, to drive the rotor both about its geometric axis and its axis of inertia. In the case of the rotation about the axis of inertia, only a rough balancing of the rotor is necessary, just enough so that the rotor in the bearing does not touch the stator. Thus, there is assured a vibration-free rotation, even if the rotor becomes unbalanced as through wear.

The rotor drive may normally comprise an electric motor, the rotor of which is formed on at least one of the face rings of the two ring rotor embodiment or on the single ring of the one ring rotor embodiment. The motor stator is formed in the housing of the flow machine in which the rotor is mounted. Therefore, no separate drive motor is required; on the contrary, motor components are constructed integrally with the flow machine and with the housing surrounding the rotor. There can be constructed, therefore, machines that define an entirely enclosed structure. This is especially important when radioactive, toxic, explosive and difficultly sealable media are engaged by the rotor.

If the bearings are constructed as hydrostatic or areostatic suspensions, then a branched-off portion of the fluid liquid or gas impelled by the rotor can be used, after corresponding pressure increase, simultaneously as the bearing medium. There is thus avoided a contamination or mixing of the impelled medium by an alien bearing medium.

The double sided intake and the high speeds of rotary rotation attainable in provided devices of this invention enable a desired object to be attained by providing machines that are small in relation to their performance.

The above and other objects of this invention will become more apparent from the following detailed description appended when read in the light of the accompanying drawings in which.

Figure 1:
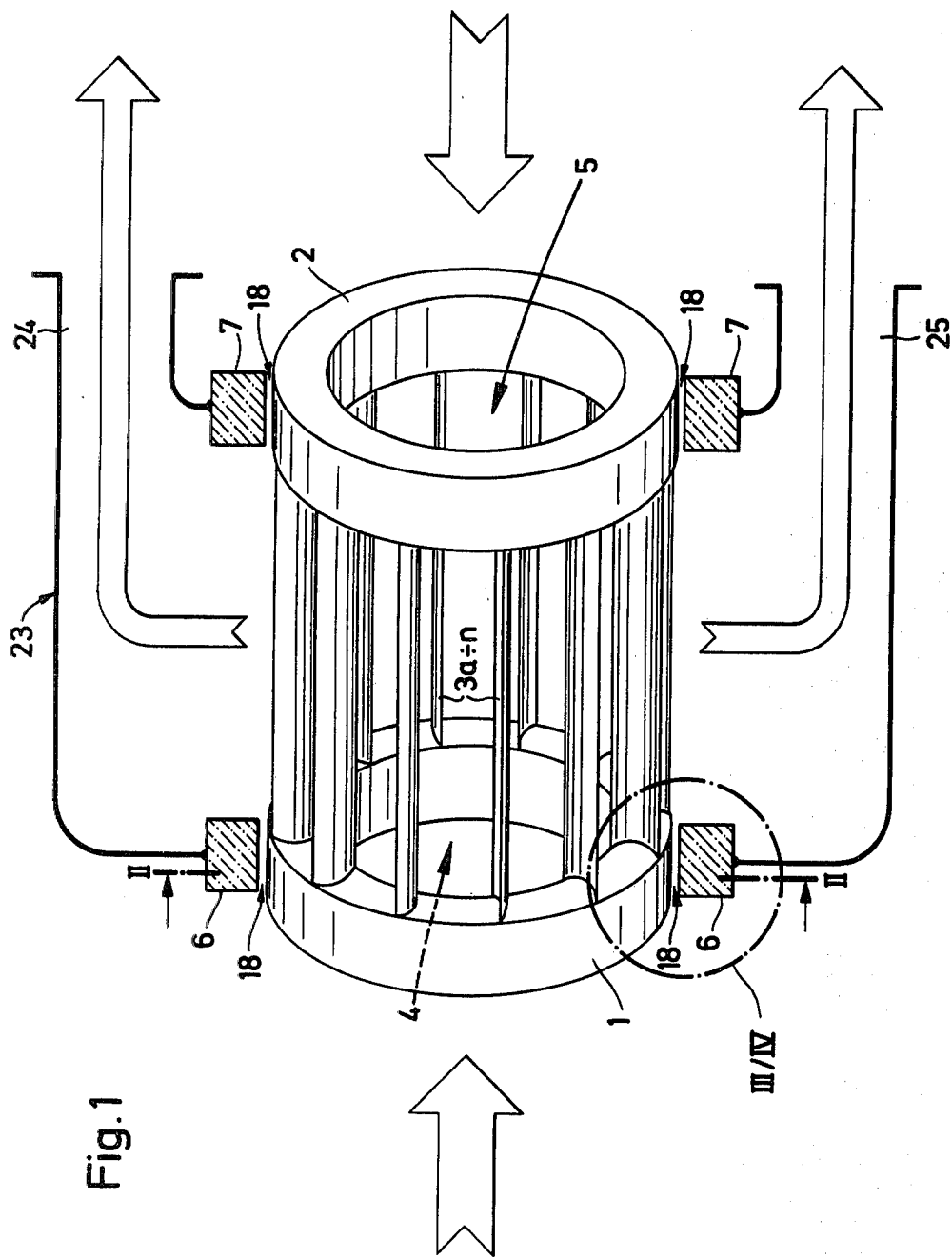
FIG. 1 is a schematic perspective view of a radial discharge machine made in pursuant to the teachings of this invention.
Figure 3:
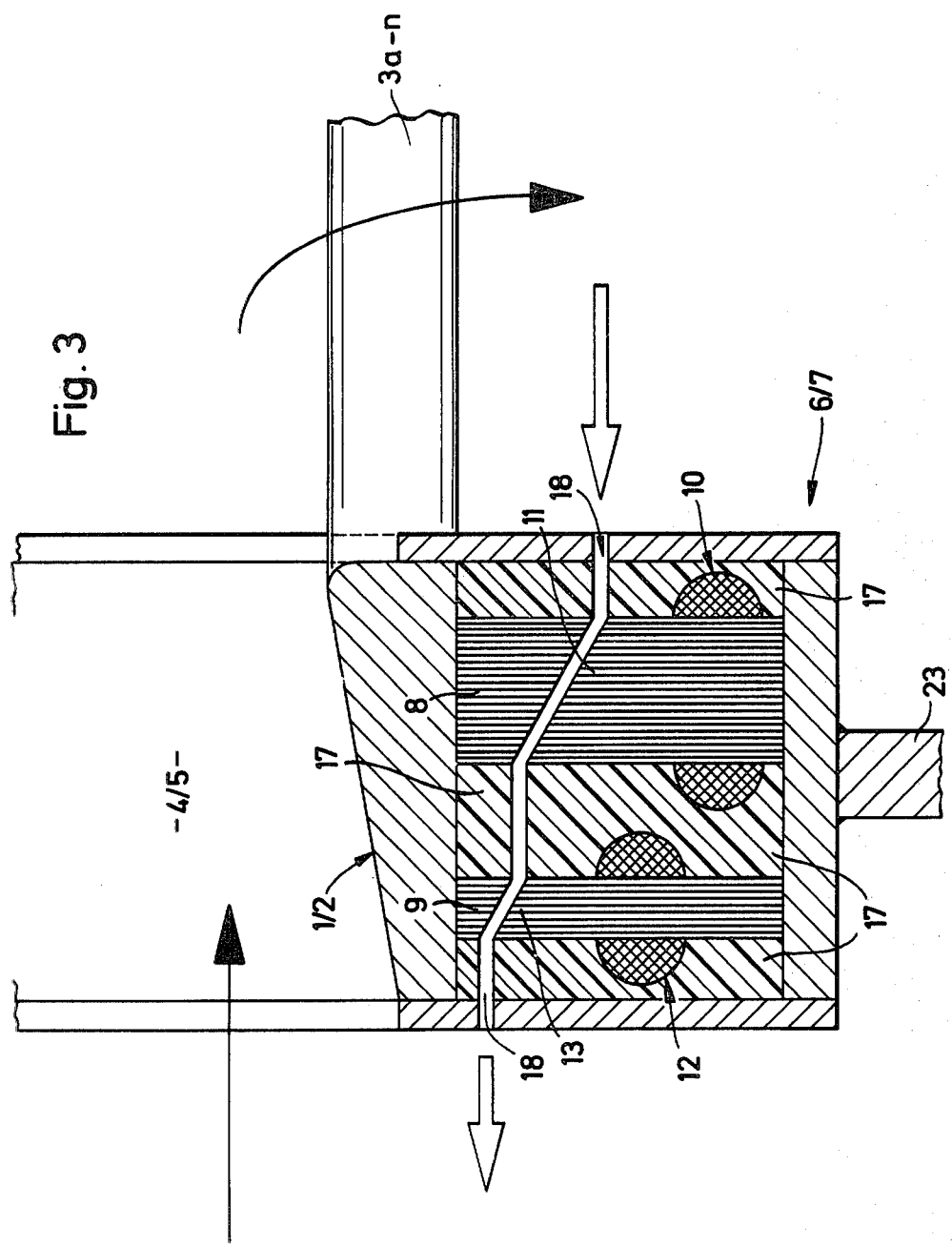
Figure 4:
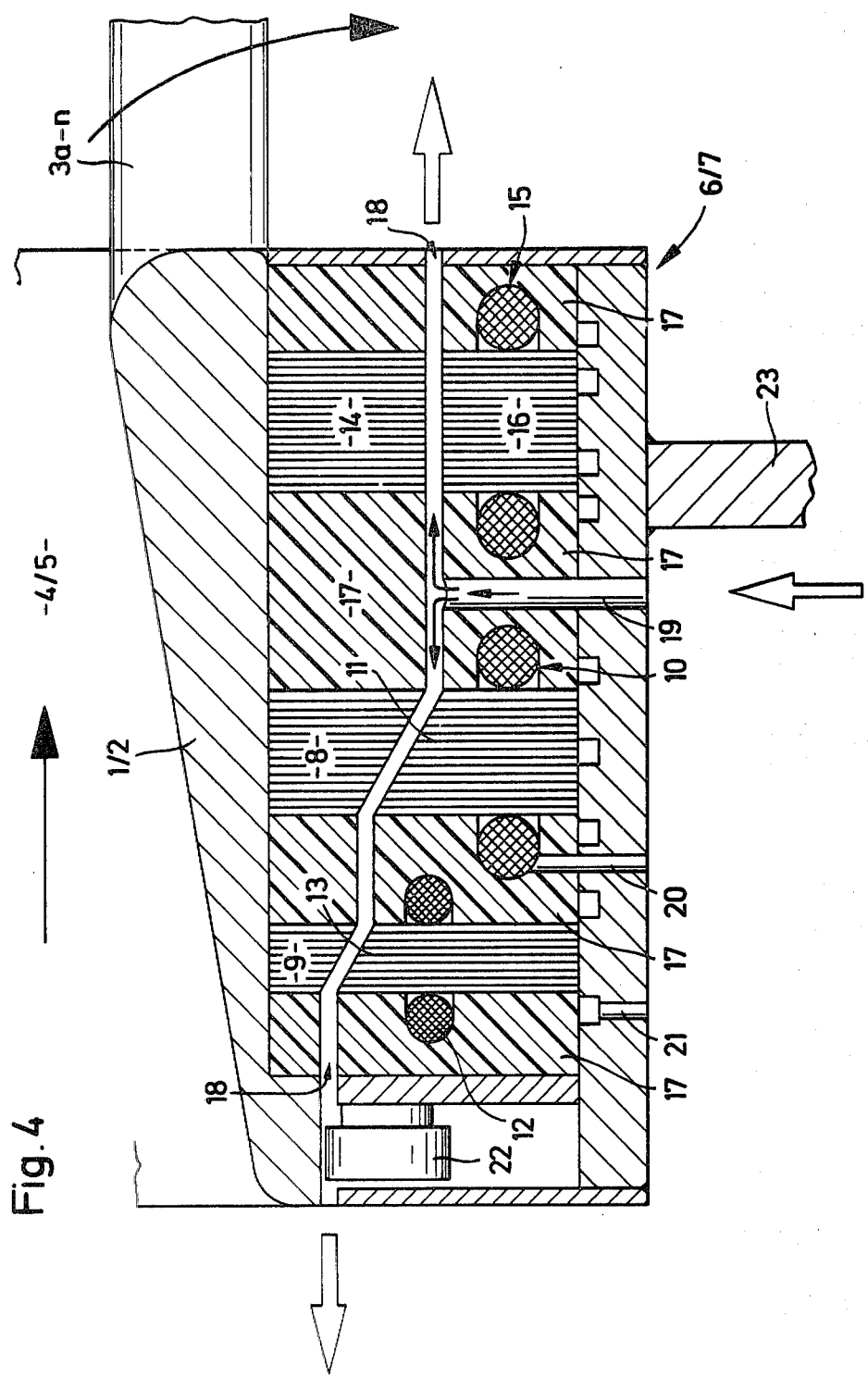
Figure 5:
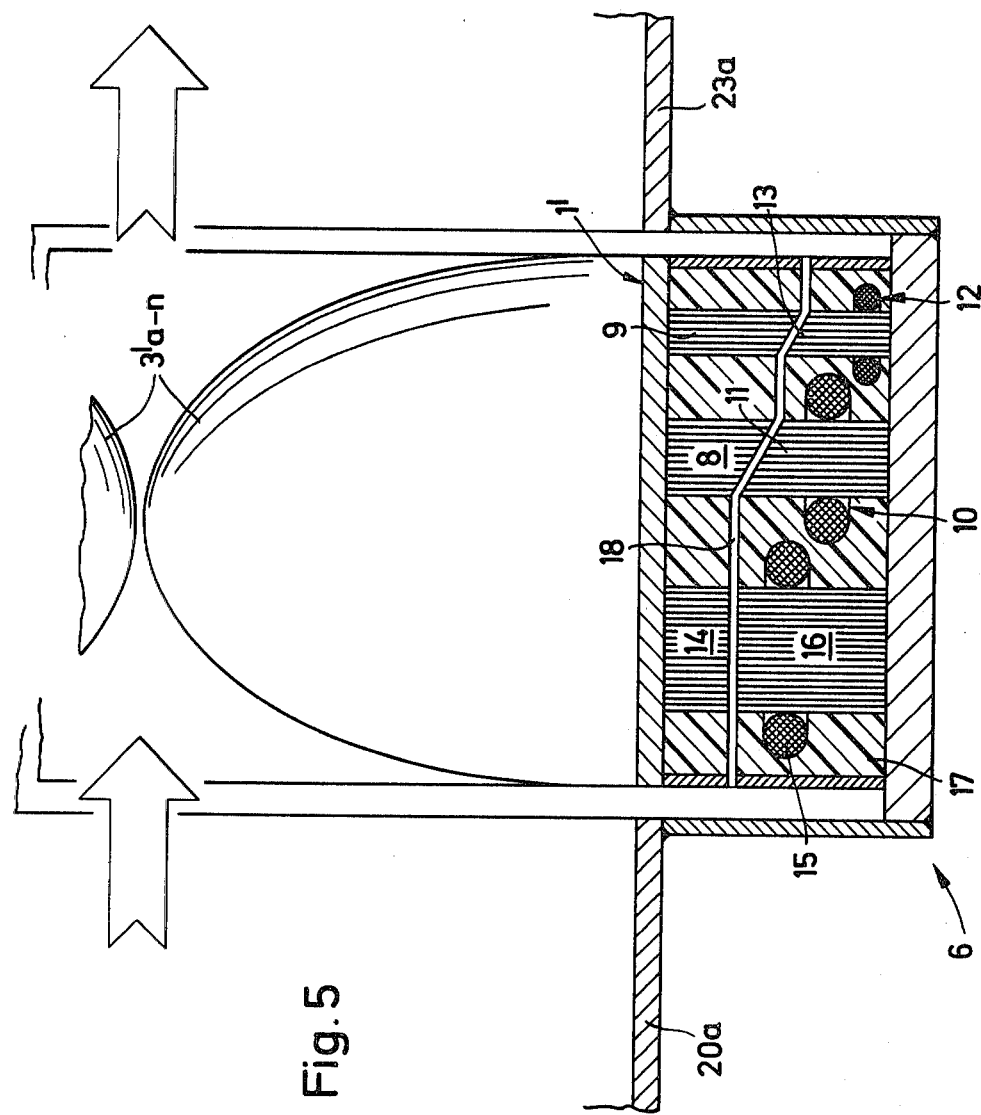

FIG. 3 comprises a sectional view illustrating on an enlarged scale an electromagnetic bearing made in accordance with this invention and located in encircled ring III of FIG. 1;

FIG. 4 is a view similar to FIG. 3 illustrating the bearing of FIG. 3 in an adjacent relationship with an electric motor drive of the rotor employed in apparatus of this invention; and FIG. 5 is a view similar to FIG. 4 of a bearing and motor drive of an axial discharge machine made in accordance with this invention.

Referring to FIG. 1, a housing 23 is schematically illustrated having a rotor mounted therein. The rotor comprises two face rings 1, 2 between which there extend elongate, radially extending impeller blades 3a–n. The blades are secured at opposed ends to the face rings 1, 2, so that a rigid unitary rotor is formed. Each face ring 1, 2 is mounted in a bearing ring 6, 7 illustrated in section in FIG. 1. The rings are snugly received within the inner periphery of housing 23. The gap between face ring 1, 2 and bearing ring 6, 7 defines a sealing gap 18 illustrated in FIG. 4.

The medium engaging the impeller blades 3a–n flows through the apparatus in the direction of the arrows illustrated in the drawing. The medium impelled by blades 3a–n flows in both ends of the rotor through relatively large intake openings 4, 5 as seen in FIG. 1. Such intake openings are seen to be concident with the inside diameter of the faceplates which is in turn substantially equal to the inside diameter of the ring defined by the impeller blades. The casing 23 is provided with ducts 24, 25 schematically shown in FIG. 1 for exhausting of the impelled medium after contacting the rotor blades.

Because of the centrifugal forces and lubricating problems associated with the use of roller bearings and other friction-type bearings, they may not be employed beyond a limited speed of rotation. In accordance with this invention, therefore, electromagnetic bearings are preferably employed such as are schematically illustrated in FIGS. 2 to 5. Such magnetic suspension of the rotor permits large rotor diameters and high speeds of rotation to be employed as such bearings are low in friction and need no lubricant.

Figure 2:
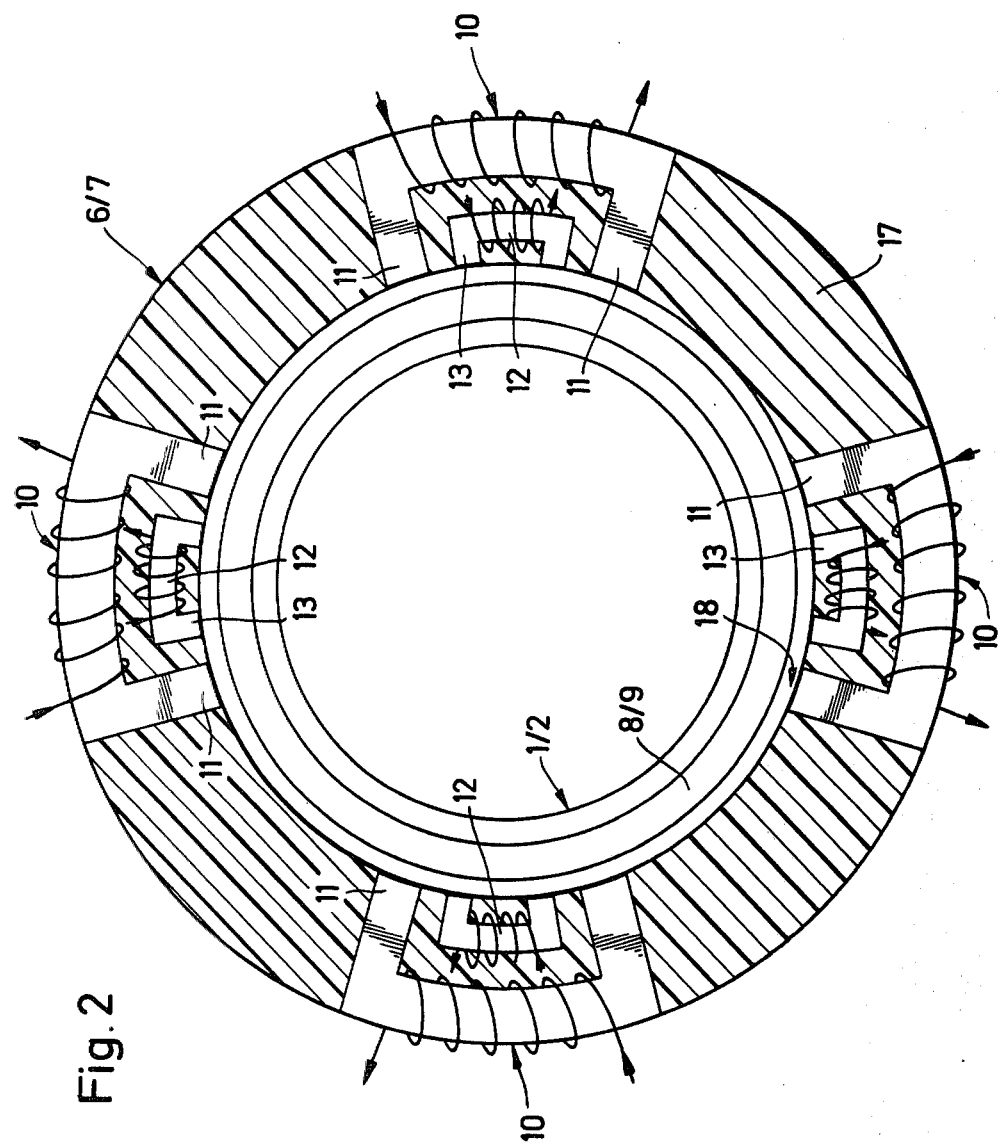
FIG. 2 is a sectional view taken on line II—II of FIG. 1, the casing being omitted.

Defining such bearings in part on each face ring 1, 2 in spaced parallel relation, are two plate packs formed of annular metal plates comprising a larger plate pack 8 and a smaller plate pack 9, see FIGS. 2–4. In each of the bearing rings 6, 7 there are arranged at uniform angular spacings four electromagnets 10 (FIG. 2), the poles 11 of which in each case are aligned with one of the larger plate packs 8 of the face rings 1, 2, as seen in FIG. 3. Employed in conjunction with the smaller plate pack 9 on the face rings 1, 2 are a number of electromagnetic sensors 12 corresponding to the number of electromagnets 10. As seen in FIGS. 2 and 3, each sensor 12 comprises an electromagnet, the poles 13 of which lie opposite the small plate pack 9. The sensors, therefore, scan in each case the distance between rotor and stator and control the excitation of the electromagnets 10, whereby the rotor is suspended free of contact in the bearing rings 6, 7.

The electromagnetic suspension makes it possible, through corresponding actuation of an electronic control system, to enable the rotor to turn about its geometric axis, as well as its axis of inertia. In rotation about the axis of inertia, only a relatively rough balancing of the rotor is necessary, i.e., only to the extent that in the region of the bearing, as well as the region of the drive, no contact occurs between rotor and stator. Thus, there is ensured a vibration-free rotor rotation, even if the rotor becomes unbalanced through material obstructions and/or wear.

The space between rotor and stator, and between the plate packs on the face rings and the bearing rings 6, 7 is of general conical configuration as indicated by FIG. 3. Thus, the rotor is locked between the bearing rings 6, 7 which limit the extent of axial shifting.

Illustrated in FIGS. 4 and 5 are electric motor drives. Thus, on the rotor face rings 1, 2, laterally of the bearing arrangement, there are arranged plate packs 14. On the stator bearing rings 6, 7 there are disposed windings 15 and magnetic cores 16.

The space between the various plate packs and windings is filled with a cast resin composition 17 in such manner that only an air gap remains between rotor and stator. The casting composition serves to insulate the electrical elements of the provided apparatus and also protects such elements from corrosion and abrasion. This air gap defines an annular gap seal 18. Thus the pressure side of the provided flow machine is simply and dependably sealed from the suction side.

A gaseous sealing medium can be introduced into the annular gap through at least one bore 19 (see FIG. 4), the flow path of the sealing medium is indicated in FIG. 4 by arrows. The sealing medium is adapted to prevent gas or liquid passage through gap 18.

In FIG. 4 numeral 20 identifies a channel for receiving the lead of a coil engaging electric cable or cables. Channel 21 enables a cooling medium to circulate from a heat exchanger into channels disposed in the bearing rings 6, 7 for heat dissipation purposes.

In FIG. 4 reference numeral 22 identifies an emergency bearing which may be employed if desired or necessary when high rotor speeds and/or heavy rotors are employed.

FIG. 5 illustrates an aforementioned axially traversed machine made in accordance with this invention in which the flow path is along the axis of rotor rotation. From the inner circumference of ring 1' there extend impeller blades 3'a–n, radially inwardly, to about the middle of a flow channel formed by a tubular casing 23a. The ring 1' has the same inside diameter as the casing 23a.

On the outer circumference of the rotor ring 1' there are arranged in an analogous manner to the apparatus arrangement of FIGS. 2–4, the annular plate packs 8 and 9 for the rotor bearing and sensor, and adjacent such elements are disposed the armature plate pack 14 for the motor. There are provided on the stator ring side magnetic poles 11, 13, 16 provided with windings for cooperating with the rotor ring elements in the manner above described in connection with the apparatus of FIGS. 1–4.

As illustrated in FIGS. 3, 4 and 5, the sensors 12 are offset with respect to the electromagnets 10, and are therefore arranged laterally beside them. The sensors 12 and their poles 13 could, however, be arranged in the same plane as the electromagnets 10, as is shown in FIG. 2 of the drawing for sake of simplicity.

It is believed that the foregoing description of the illustrated apparatus embodiments has made apparent to those skilled in the art a number of modifications which remain within the ambit of the invention disclosed. This invention is to be limited, therefore, only by the scope of the appended claims.

What is claimed is:

1. A flow machine for separating particles in a flowable medium, the machine having a rotor rotatably mounted in a housing, said rotor comprising two face rings spaced apart in the axial direction of the rotor and a plurality of blades extending axially therebetween, said rings being supported for rotation about their outer circumferences in the housing and at least one of the rings being driven, and an inlet and an outlet in the housing for flowable medium, said flowable medium being drawn through the flow machine so that it flows axially through the rotor and traverses the blades substantially radially as it flows between the inlet and the outlet effecting a separation of particles in the flowable medium.

2. A flow machine according to claim 1, in which the flowable medium passes axially through both face rings as it flows through the machine.

3. A flow machine according to claim 1 or 2, in which the rotor is mounted on magnetic bearings.

4. A flow machine according to claim 1 or 2, in which each face ring has disposed therein a plate pack oppositely disposed to electromagnets uniformly distributed about the circumference on the housing; each ring having also mounted therein a revolving plate pack, which cooperates with electromagnetic sensors which are likewise arranged on the housing and uniformly distributed about the circumference thereof.

5. A flow machine according to claim 4, in which the rotor is driven by a drive comprising an electric motor, the rotor armature of which is formed at or on at least one of the face rings and the stator of which is formed in the housing.

6. A flow machine according to claim 5, in which the plate packs on the rotor and on the stator are embedded in a synthetic resin composition and a sealing gap is formed between the rotor and the stator.

7. A flow machine according to claim 6 in which the housing is provided with a channel extending into the sealing gap for the supplying of a sealing medium thereto.

8. A flow machine according to claim 1 or 2 in which the housing is provided with a heat dissipating means.

9. A flow machine according to claim 1 or 2 in which an emergency bearing is provided on the housing for supportably engaging the rotor.

10. A flow machine according to claim 1 in which the rotor is locked to said housing by conical bearings at opposed rotor ends whereby axial shifting of said rotor relative to said housing is limited.

* * * * *